United States Patent [19]

Tonomura

[11] Patent Number: 5,671,220
[45] Date of Patent: Sep. 23, 1997

[54] SATELLITE CHANNEL INTERFACE IN INDOOR UNIT USED FOR SATELLITE DATA COMMUNICATION

[75] Inventor: Fumio Tonomura, Shiga, Japan

[73] Assignee: NEC Corporation, Tokyo, Japan

[21] Appl. No.: 497,248

[22] Filed: Jun. 30, 1995

[30] Foreign Application Priority Data

Jul. 12, 1994 [JP] Japan .................. 6-160161

[51] Int. Cl.$^6$ .................. H04B 1/10; H04B 1/26
[52] U.S. Cl. .................. 370/281; 455/301
[58] Field of Search .................. 370/30, 281; 455/300, 455/301, 3.2, 131; 361/794, 414

[56] References Cited

U.S. PATENT DOCUMENTS

| | | | |
|---|---|---|---|
| 4,353,132 | 10/1982 | Saitoh et al. | 455/301 |
| 4,689,825 | 8/1987 | Geiger et al. | 455/301 |
| 4,691,376 | 9/1987 | Watanabe et al. | 455/131 |
| 5,278,524 | 1/1994 | Mullen | 333/1 |
| 5,355,532 | 10/1994 | Kubo et al. | 455/301 |
| 5,363,280 | 11/1994 | Chobot et al. | 361/794 |
| 5,423,080 | 6/1995 | Perdet et al. | 455/300 |
| 5,475,876 | 12/1995 | Terada et al. | 455/301 |

FOREIGN PATENT DOCUMENTS

| | | |
|---|---|---|
| 461938 | 5/1992 | Japan . |
| 529852 | 2/1993 | Japan . |

*Primary Examiner*—Benedict V. Safourek
*Assistant Examiner*—Chau T. Nguyen
*Attorney, Agent, or Firm*—Whitham, Curtis, Whitham & McGinn

[57] ABSTRACT

A satellite channel interface (SCI) is constituted by an analog section having a multiplexer unit and a down converter unit, and a digital section constituted by a modulator-demodulator unit. The satellite channel interface has a single printed circuit board on which all of the above units are formed. A rectangular member surrounds the analog section, and a shield cover shields an opening portion of the rectangular member. The single printed circuit board is a multi-layered board constituted by at least three conductive layers, of which the bottom two layers are grounding electrodes. The SCI does not require the terminals and cables which are otherwise necessary, can be made compact, and can be manufactured with the reduced number of processing steps.

3 Claims, 2 Drawing Sheets

SATELLITE CHANNEL INTERFACE IN INDOOR UNIT USED FOR SATELLITE DATA COMMUNICATION

BACKGROUND OF THE INVENTION (1) Field of the Invention

The present invention relates to a high frequency device which is utilized as a satellite communication earth station, and more particularly to a satellite channel interface (hereinafter referred to as "SCI") of an indoor unit used in a Very Small Aperture Terminal (hereinafter referred to as "VSAT") for bi-directional satellite communication.

(2) Description of the Related Art

In recent years, a bi-directional data communication system using a communication satellite has become available. A configuration of the VSAT which is one type of such systems is outlined in Japanese Utility Model Application Kokai Publication No. Hei 04-61938. This VSAT is hereinafter briefly explained with reference to FIG. 1.

As shown in FIG. 1, for receiving data, a data signal of 12–14 GHz sent from a communication satellite 1 is received at an on-earth antenna 2. This received data signal is transmitted from the on-earth antenna 2 to an outdoor unit 3 (hereinafter referred to as "ODU 3") wherein the data signal is converted into a first intermediate frequency band (1 GHz band). The converted data signal is transmitted to an indoor unit 4 (hereinafter referred to as "IDU 4"). In the IDU 4, the data signal is converted into an analog signal of a second intermediate frequency band by a down converter unit 5 (hereinafter referred to as "D/C 5"), the analog signal is demodulated to a digital data by a demodulator 6 (hereinafter referred to as "DEM 6"), and the demodulated signal is processed by a central processing unit 7 (hereinafter referred to as "CPU 7").

On the other hand, for transmitting data, the digital data signal sent out from the CPU 7 is modulated into an analog signal by a modulator 8 (hereinafter referred to as "MOD 8") and, after being converted to a high frequency signal of a first intermediate frequency band, is sent out to the ODU 3 through a multiplexer 9 (hereinafter referred to as "MPX 9"). The signal thus sent out from the IDU 4 is converted into a data signal of 12–14 GHz by the ODU 3 and is transmitted to the communication satellite 1 through the on-earth antenna 2.

As shown in FIG. 2, the satellite channel interface (SCI) 11 refers to a structure made up of a combination, within the IDU 4, of the D/C 5, the MPX 9 and a modulator-demodulator 10 (hereinafter referred to as "MODEM 10") which is constituted by the DEM 6 and the MOD 8. Conventionally, in the manufacture of the SCI 11, the D/C 5, MPX 9 and MODEM 10 which respectively perform different functions are such that, in order to prevent mutual interferences and also to provide differing grounding configurations depending on different frequencies, they are assembled respectively on different printed circuit boards and are then housed respectively in different shield cases. Therefore, it has been required that each unit of the D/C 5, MPX 9 and MODEM 10 be individually adjusted and checked, and the SCI 11 be formed by connecting them using a plurality of coaxial cables 12.

Where the respective units of the SCI are housed in different shield cases as explained above, since the individual units must be separately adjusted and checked for assembling them as the SCI, the individual unit specifications require extra margins, the cost of manufacture becomes high due to the need of the individual shield cases and of input/output terminals and cables for connecting them, and the steps for manufacture and the space for assembling the individual units inevitably increase.

SUMMARY OF THE INVENTION

An object of the present invention, therefore, is to overcome the problems existing in the prior art and to provide the SCI in which all of the individual units are formed on a single printed circuit board. In this way, the SCI does not require the terminals and cables which are otherwise necessary, can be made compact, and can be manufactured with the reduced number of steps by eliminating such steps as adjusting and checking steps.

According to one aspect of the invention, there is provided a satellite channel interface constituted by an analog section having a multiplexer unit and a down converter unit, and a digital section constituted by a modulator-demodulator unit, the satellite channel interface comprising:

a single printed circuit board on which all of the units are formed;

a rectangular member surrounding the analog section; and a shield cover shielding an opening portion of the rectangular member.

The invention enables the arrangement of the MPX, D/C and MODEM of the SCI for the VSAT on the single printed circuit board such that there are no mutual interferences among them.

According to the invention, the analog section is shielded and, since this prevents the mutual interferences between the analog section and the digital section, it is possible to arrange on the single printed circuit board the analog section constituted by the MPX and the D/C and the digital section constituted by the MODEM.

Where the multi-layered board at the analog section has three or more conductive layers and the bottom two layers thereof are made as double grounding electrodes, the shielding of the analog section becomes complete and the isolation of the analog section from the digital section can be enhanced. Also, by adopting the multi-layer configuration for the multi-layered board, the circuit wiring at the digital section can be arranged in a three dimensional form, and the SCI can be further scaled down.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
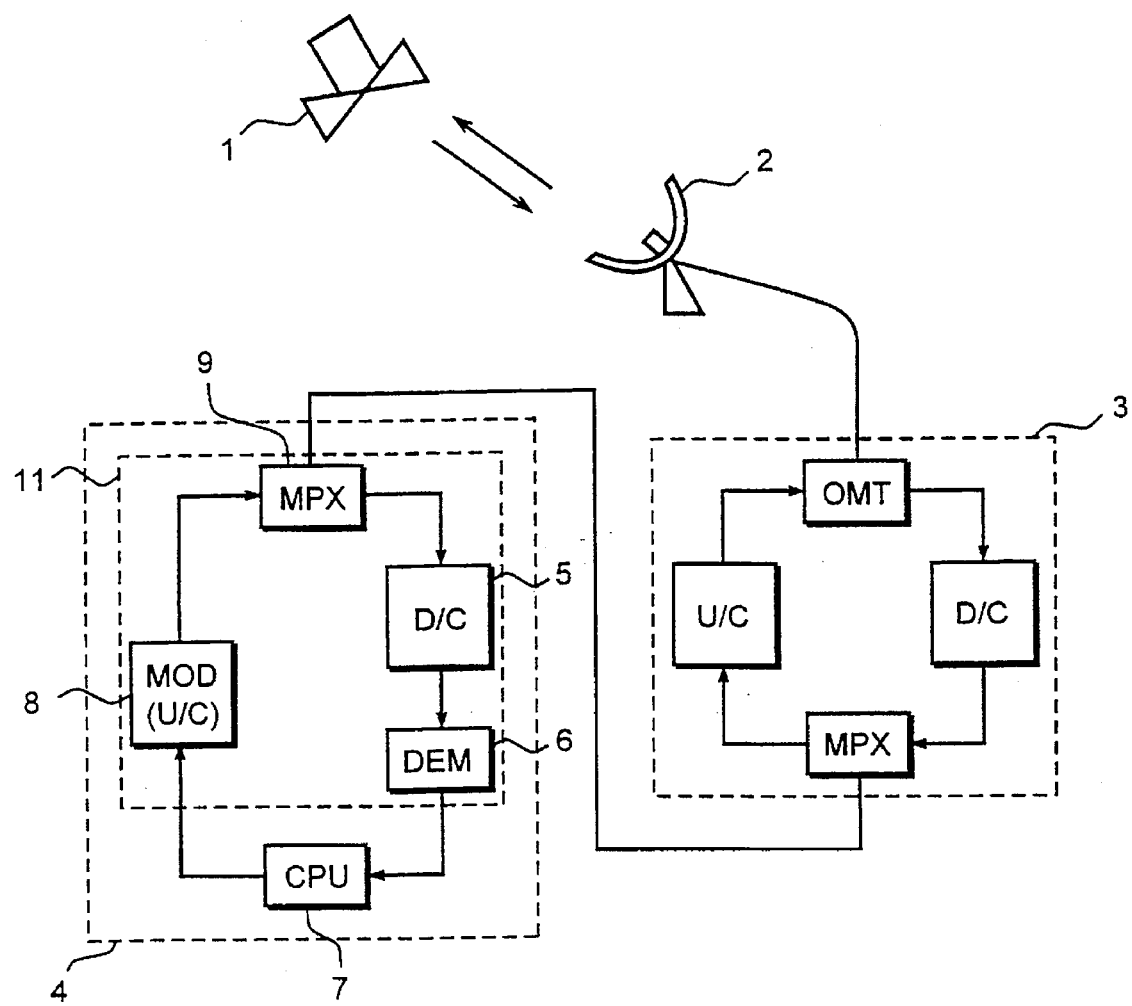
FIG. 1 is a block diagram of a conventional VSAT communication satellite.
Figure 2:
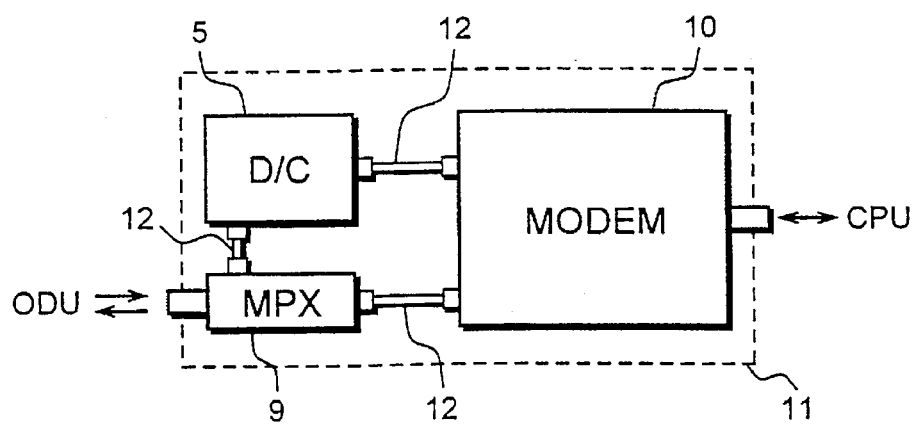
FIG. 2 is a structural diagram of a conventional SCI.

Now, preferred embodiments of the invention are explained with reference to the drawings. In the drawings, for the same or like elements as in the prior art described above, the same or like reference numerals are used and the explanation therefor is not repeated.

Figure 3A:
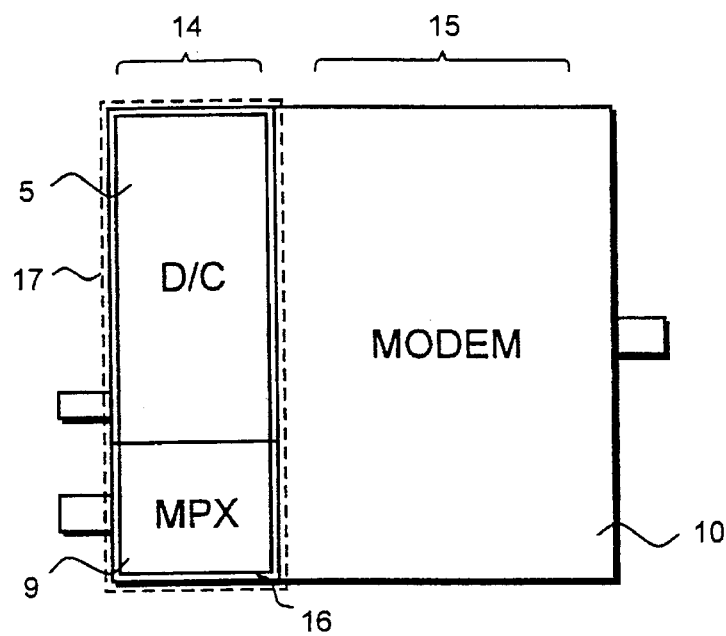
FIG. 3A is a structural diagram of an SCI of a first embodiment according to the invention.
Figure 3B:
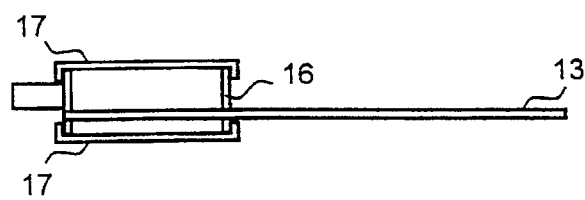
FIG. 3B is a cross-sectional diagram of the SCI shown in FIG. 3A.

A first embodiment of the satellite channel interface (SCI) according to the invention is shown in FIGS. 3A and 3B. As shown therein, the high frequency SCI is configured such that a single printed circuit board 13 is divided into two blocks or sections. Specifically, an analog section 14 constituted by a D/C 5 and an MPX 9 and a digital section 15 constituted by a MODEM 10 are arranged adjacent to each other respectively on the two blocks. The portion of the printed circuit board 13 that is at the analog section 14 is defined by a rectangular member 16 surrounding the analog section 14, and an opening portion of the rectangular member 16 is shielded by a shielding cover 17.

In the SCI thus constructed, the analog section 14 which processes high frequency signals above 1 GHz is completely shielded so that there is no interference between the analog section 14 and the digital section 15 even where they are positioned adjacent to each other on the single printed circuit board 13.

Normally, in a high frequency device of the kind as explained above, the printed circuit board employs a board having two conductive layers which are formed respectively on front and back sides of an insulating plate of, for example, glass epoxy, the first layer has circuits and the second layer is used as a grounding electrode.

Figure 4A:
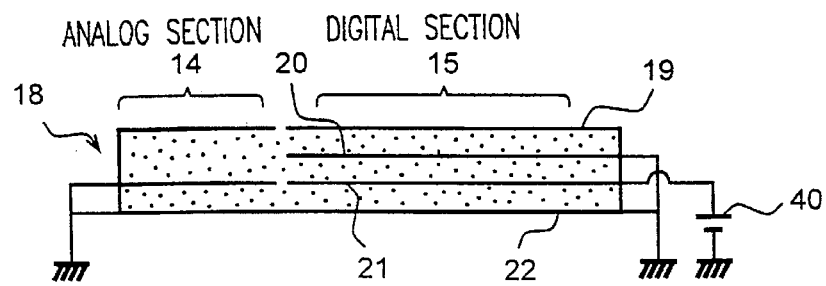
FIG. 4A is a cross-sectional diagram of the SCI of a second embodiment according to the invention.

However, in the SCI of a second embodiment according to the invention, as shown in FIG. 4A, the printed circuit board 18 employs a board which has four conductive layers laminated one over another with respective insulating plates being sandwiched therebetween. The portion of the printed circuit board 18 at which the analog section 14 is formed has the first conductive layer 19 having circuits formed thereon and, the third and fourth conductive layers 21 and 22 used for double grounding electrodes. It should be noted that the second conductive layer at the analog section 14 has been removed in advance as shown in the drawings. The portion of the printed circuit board 18 at which the digital section 15 is formed has the first conductive layer 19 used for signal processing circuits, the second conductive layer 20 used for a grounding electrode, the third conductive layer 21 used for power source circuits connected to a DC power source 40, and the fourth conductive layer 22 used for a grounding electrode.

With the above construction, the shielding of the analog section is strengthened, the isolation between the analog section and the digital section is enhanced and, since the circuits at the digital section 15 can be arranged three-dimensionally, the overall structure of the SCI can be made still more compact. Also, since the second conductive layer 20 of the printed circuit board 18 at the analog section 14 has already been removed in advance, the space between the first conductive layer 19 for the circuits and the third conductive layer 21 for the grounding electrode can be increased thereby enabling the reduction in a grounding capacitance, hence the reduction in high frequency losses through the board at the analog section, and the ease in designing patterns.

In the foregoing, the explanation has been made on an example wherein the printed circuit board 18 with four conductive layers is used as such a board.

Figure 4B:
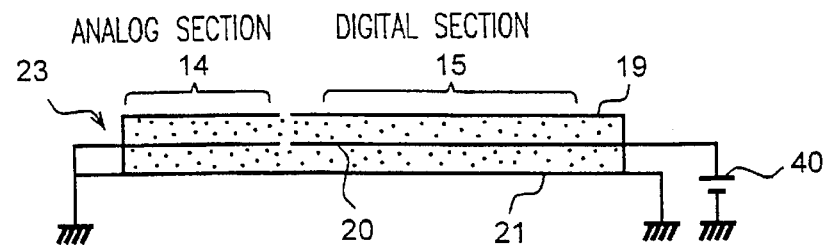
FIG. 4B is a cross-sectional diagram of the SCI of a third embodiment according to the invention.

FIG. 4B shows an arrangement of a third embodiment according to the invention in which a printed circuit board 23 has three conductive layers. Here, in the portion having the analog section 14, the first conductive layer 19 is used for forming circuits, the second conductive layer 20 and the third conductive layer 21 are used for the grounding electrodes while, in the portion having the digital section 15, the signal processing circuit and the power source circuit which is connected to a DC power source 40 are formed respectively in the first conductive layer 19 and the second conductive layer 20, and the third conductive layer 21 is used as the grounding electrode.

Further, in the case where, by using a printed circuit board having 6–8 conductive layers, the circuits are formed in a plurality of layers or the number of layers of grounding electrodes is increased, it is possible to make the SCI still more compact and to ensure complete isolation between the analog section and the digital section.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A satellite channel interface of an indoor unit used in a Very Small Aperture Terminal (VSAT) for communication satellite-based bi-directional data transmission, constituted by an analog section having a multiplexer unit connected to an outdoor unit of said VSAT and a down converter unit for frequency-converting a high frequency signal supplied from said outdoor unit through said multiplexer, and a digital section having a modulator-demodulator unit for demodulating the output of said down converter unit and for modulating a digital data signal into an analog signal for transmission through said multiplexer and said outdoor unit, said satellite channel interface comprising:

a single multi-layered printed circuit board including at least three mutually insulated conductive layers each having first and second portions electrically separated from each other and respectively assigned to said analog section and said digital section to allow all of said units to be formed thereon;

a rectangular shielding member mounted onto said multi-layered printed circuit board defining said first portion; and a shield cover for shielding an opening portion of said rectangular shielding member, wherein first and second conductive layers of said first portion of said multi-layered printed circuit board as counted from a bottom of said multi-layered printed circuit board form grounding electrodes for facilitating the isolation between said analog section and said digital section.

2. A satellite channel interface according to claim 1, wherein said multi-layered printed circuit board at said first portion has four conductive layers, wherein third and fourth conductive layers of said first portion of said multi-layered printed circuit board as counted from a top of said multi-layered printed circuit board form grounding electrodes facilitating the isolation between said analog and said digital section, and wherein a first conductive layer of said first portion of said multi-layered printed circuit board has printed circuits for forming said units of said analog section, with a second conductive layer of said first portion being absent to reduce a grounding capacitance and thereby reduce high frequency energy losses at said analog section.

3. A satellite channel interface according to claim 2, wherein said second and fourth conductive layers of said second portion of said multi-layered printed circuit board form grounding electrodes and said third conductive layer of said second portion of said multi-layered printed circuit board forms a power source circuit for connection to a direct current (DC) power source.

* * * * *